(12) United States Patent
Tsunooka et al.

(10) Patent No.: US 7,368,407 B2
(45) Date of Patent: May 6, 2008

(54) HIGH-FREQUENCY PORCELAIN COMPOSITION, PROCESS FOR PRODUCING THE SAME AND PLANAR HIGH-FREQUENCY CIRCUIT

(75) Inventors: Tsutomu Tsunooka, Aichi (JP); Hitoshi Ohsato, Aichi (JP); Tomonori Sugiyama, Aichi (JP)

(73) Assignees: Yasufuku Ceramics Co., Ltd., Aichi (JP); Marusu Glaze Co., Ltd., Aichi (JP)

( * ) Notice: Subject to any disclaimer, the term of this patent is extended or adjusted under 35 U.S.C. 154(b) by 137 days.

(21) Appl. No.: 10/558,375

(22) PCT Filed: May 28, 2004

(86) PCT No.: PCT/JP2004/007390

§ 371 (c)(1),
(2), (4) Date: Nov. 29, 2005

(87) PCT Pub. No.: WO2004/106261

PCT Pub. Date: Dec. 9, 2004

(65) Prior Publication Data

US 2007/0027022 A1 Feb. 1, 2007

(30) Foreign Application Priority Data

May 30, 2003 (JP) .................. 2003-154341

(51) Int. Cl.
*C04B 35/20* (2006.01)
*H01B 3/12* (2006.01)
*H01G 4/12* (2006.01)

(52) U.S. Cl. ............... 501/122; 501/134; 428/450; 428/702

(58) Field of Classification Search ........... 501/122, 501/134; 428/450, 702
See application file for complete search history.

(56) References Cited

U.S. PATENT DOCUMENTS

| | | | | |
|---|---|---|---|---|
| 5,496,619 | A * | 3/1996 | Itagaki et al. | 428/209 |
| 5,725,808 | A * | 3/1998 | Tormey et al. | 252/514 |
| 6,136,734 | A * | 10/2000 | Jean et al. | 501/32 |
| 7,208,043 | B2 * | 4/2007 | Tachikawa et al. | 117/20 |
| 7,208,434 | B2 * | 4/2007 | Kim et al. | 501/122 |

FOREIGN PATENT DOCUMENTS

| | | | |
|---|---|---|---|
| JP | 5-345662 | * | 12/1993 |
| JP | 8-139504 | | 5/1996 |
| JP | 3083638 | | 6/2000 |

(Continued)

*Primary Examiner*—Karl E Group
(74) *Attorney, Agent, or Firm*—Wenderoth, Lind & Ponack, L.L.P.

(57) ABSTRACT

A sintering temperature can be lowered to 1,200° C. by adding from 15% by weight or more to 35% by weight or less of rutile-type titanium dioxide into forsterite. By carrying out sintering at such a low temperature, a sintered product can be obtained in which sintering was carried out while retaining the respective crystal phases of the forsterite and rutile-type titanium dioxide. Such a sintered product is an excellent high-frequency ceramic composition, wherein the high quality factor $Q \cdot f$ value derived from forsterite is hardly impaired, and, the absolute value of the temperature coefficient $\tau_f$ is controlled to 30 ppm/° C. or less by rutile-type titanium dioxide.

5 Claims, 14 Drawing Sheets

FOREIGN PATENT DOCUMENTS

| | | | |
|---|---|---|---|
| JP | 3083645 | | 6/2000 |
| JP | 2000-344571 | | 12/2000 |
| JP | 2001-130952 | * | 5/2001 |
| JP | 2002-104870 | * | 4/2002 |
| SU | 275192 | * | 2/1971 |

* cited by examiner $MgO-SiO_2-TiO_2$

System $MgO-SiO_2-TiO_2$; proposed revision.

Franco Massazza and Efisia Sirchia, *Chim. Ind.* (*Milan*), 40, 466 (1958).

US 7,368,407 B2

HIGH-FREQUENCY PORCELAIN COMPOSITION, PROCESS FOR PRODUCING THE SAME AND PLANAR HIGH-FREQUENCY CIRCUIT

TECHNICAL FIELD

The present invention relates to a high-frequency ceramic composition and a production method thereof, and a high-frequency planar circuit.

BACKGROUND ART

Due to recent developments in information and communication technology, dielectric materials are becoming ever more important in determining the characteristics of communications circuits. Characteristics demanded by such dielectrics usually include (i) having an appropriately large relative dielectric constant ($\in_r$) corresponding to the intended target in the microwave band; (ii) a small dielectric loss, i.e. a high quality factor (Q·f; wherein Q is the reciprocal of the dielectric loss tangent tan δ, and f is the resonance frequency); and (iii) a small absolute value of the temperature coefficient ($\tau_f$) of resonance frequency.

Forsterite is known as one such dielectric ceramic. This substance consists of the reaction product ($Mg_2SiO_4$) of Mg and $SiO_2$, and possesses comparatively excellent high-frequency characteristics.

The present inventors have previously developed a forsterite ceramic, which has a small dielectric loss in the microwave range, by controlling the impurities that are mixed in and the grain size of the powder during the forsterite production process (refer to Patent Document 1). The present inventors have also experimented with low-temperature firing, by adding 10% by weight or less of a rutile-type titanium dioxide (herein after sometimes simply called "titanium dioxide") (refer to Patent Document 2).

[Patent Document 1]
Japanese Patent No. 3083638

[Patent Document 2]
Japanese Patent No. 3083645

SUMMARY OF THE INVENTION

Problems to be Solved by the Invention

However, forsterite has a drawback in that its resonance frequency temperature coefficient ($\tau_f$) is about −70 ppm/° C., which is large on the negative side. For this reason, the present range of applications for forsterite has been unable to expand much further.

The present invention was created in consideration of the above matters. It is an object of the present invention to provide a high-frequency ceramic composition and production method thereof, which can realize an improvement in temperature characteristics while maintaining the excellent high-frequency characteristics that forsterite has.

Means for Solving the Problem

The present inventors have discovered the following insights through continued research into improving the dielectric properties of forsterite by adding titanium dioxide.

In contrast to forsterite's large negative temperature coefficient $\tau_f$ of about −70 ppm/° C., titanium dioxide possesses a large positive temperature coefficient f of 450 ppm/° C. In view of these values, under the assumption that forsterite particles and titanium dioxide particles exist independently in the ratio of when they were mixed, and if a calculation is made based on the fact that the temperature coefficient $\tau_f$ is determined by that ratio, the calculation thereof suggests that it would be possible to make the temperature coefficient $\tau_f$ roughly 0 ppm/° C. by adding 13.3% by weight of titanium dioxide with respect to forsterite.

However, if titanium dioxide is added into forsterite and the resulting mixture is fired under ordinary firing conditions, the two components react with each other to form $MgSiO_3$ and $MgTi_2O_5$, whereby the excellent dielectric properties possessed by forsterite of a high quality factor Q·f are lost. Furthermore, the expected controlling effect on the temperature coefficient $\tau_f$ cannot be achieved. FIG. 14 illustrates a phase diagram in an $MgO-SiO_2-TiO_2$ three-component system (extract from "Phase Diagrams for Ceramists, Vol. I" The American Ceramic Society INC.). As can be understood from this figure, a person skilled in the art would well know that $MgSiO_3$ and $MgTi_2O_5$ are generated in an $MgO-SiO_2-TiO_2$ three-component system. Accordingly, based on the common knowledge of those skilled in the art, it was thought that it would be difficult to improve dielectric properties through the addition of titanium dioxide into forsterite.

However, from detailed investigations into factors such as firing conditions, the present inventors made the totally unexpected discovery that forsterite and titanium dioxide could be made to coexist and undergo firing by adding a large quantity of titanium dioxide into the forsterite, and lowering the firing temperature to 1,200° C. This was a first for successfully synthesizing a sintered product that retained the forsterite and titanium dioxide crystal phases.

It was further discovered that the obtained sintered product not only maintains a high quality factor Q·f, but also that its temperature coefficient $\tau_f$ are adjusted to match the added amount of titanium dioxide. That is, it was discovered that the temperature coefficient $\tau_f$ could be adjusted to approximately 0 ppm/° C. by additionally adding the amount of titanium dioxide that would be used in forming $MgSiO_3$ and $MgTi_2O_5$, on top of the amount required for making the calculated temperature coefficient $\tau_f$ 0 ppm/° C. (13.3% by weight of titanium dioxide with respect to forsterite). The present invention was created based on this novel insight.

That is, the high-frequency ceramic composition according to the present invention is a sintered product of forsterite and rutile-type titanium dioxide, characterized in that the forsterite and the rutile-type titanium dioxide are sintered while retaining respective crystal phases thereof.

Here, the expression "sintered while retaining respective crystal phases thereof" not only includes the case where the crystal phases of the forsterite and the rutile-type titanium dioxide are perfectly retained, but also cases where the forsterite and the titanium dioxide have partially transformed into $MgSiO_3$ and $MgTi_2O_5$.

Further, the method for producing a high-frequency ceramic composition according to the present invention is characterized by carrying out: a calcining step for obtaining forsterite by calcining a raw material powder in which MgO and $SiO_2$ are mixed in a 2 to 1 molar ratio; a mixing step that mixes into the forsterite, 15% by weight or more to 35% by weight or less with respect to the forsterite of rutile-type titanium dioxide, and binder, and that grinds until a mixed powder having an average grain size of 3 μm or less is obtained; a molding step for obtaining a molded product by pressure-molding the mixed powder; and a sintering step that subjects the molded product to a degreasing treatment for subsequent firing at about 1,200° C.

EFFECTS OF THE PRESENT INVENTION

The sintered product according to the present invention can provide an excellent high-frequency ceramic composition, wherein the high quality factor Q·f value derived from forsterite is hardly impaired, and, the absolute value of the temperature coefficient $\tau_f$ is controlled to 30 ppm/° C. or less by rutile-type titanium dioxide.

Further, according to the production method of the present invention, a sintered product can be obtained that is sintered while retaining the respective crystal phases of forsterite and rutile-type titanium dioxide by adding rutile-type titanium dioxide into the forsterite in a ratio of 15% by weight or more to 35% by weight or less, and lowering the firing temperature to about 1,200° C. This allows an excellent high-frequency ceramic composition to be provided, wherein the high quality factor Q·f value derived from forsterite is hardly impaired, and, the absolute value of the temperature coefficient $\tau_f$ is controlled to 30 ppm/° C. or less by rutile-type titanium dioxide. Furthermore, applications can be expected as a ceramic material that requires firing at a comparatively low temperature, such as electronic devices that are manufactured by a co-firing process that carries out substrate firing simultaneously with electrode formation.

Figure 3:
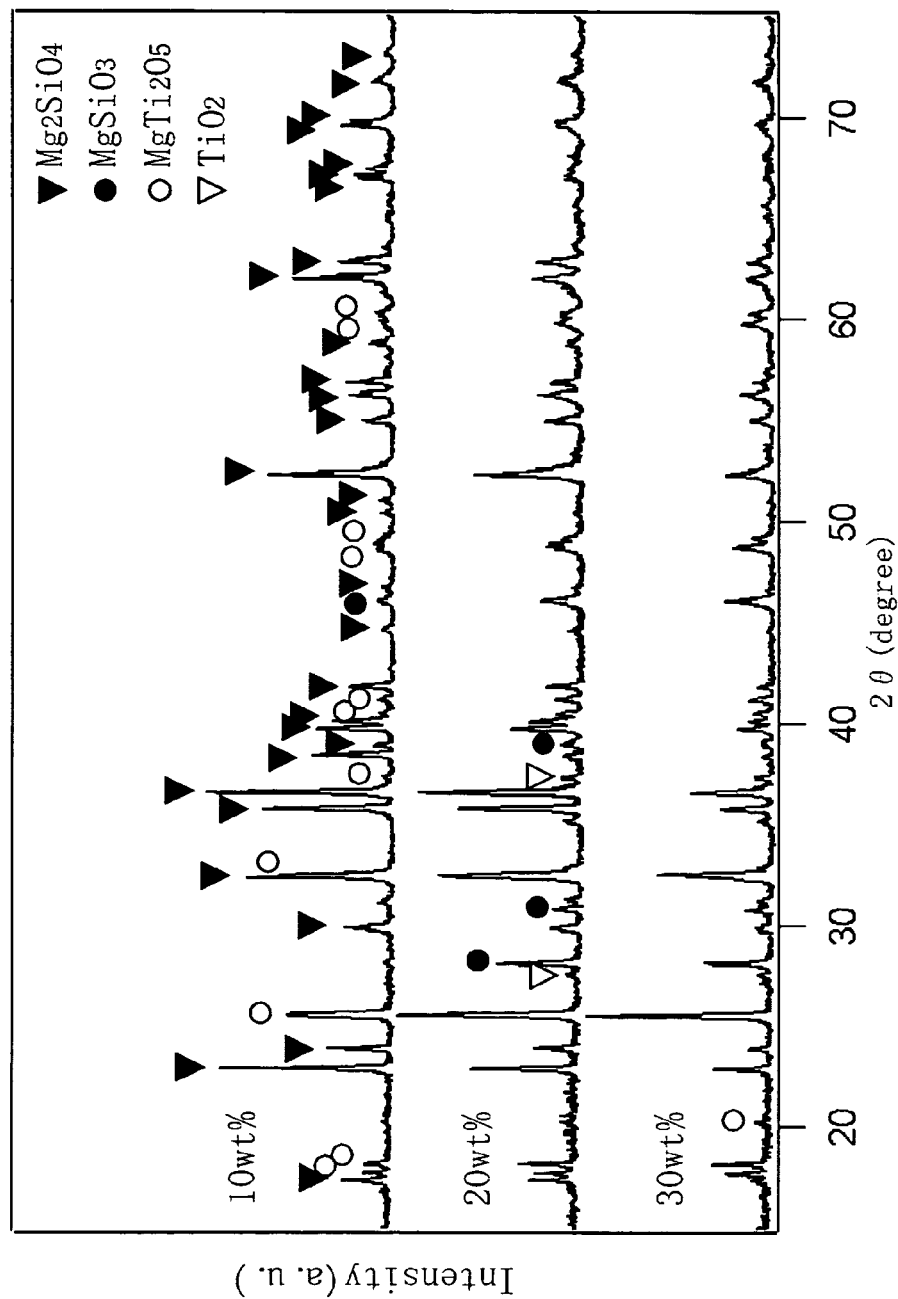
Figure 4:
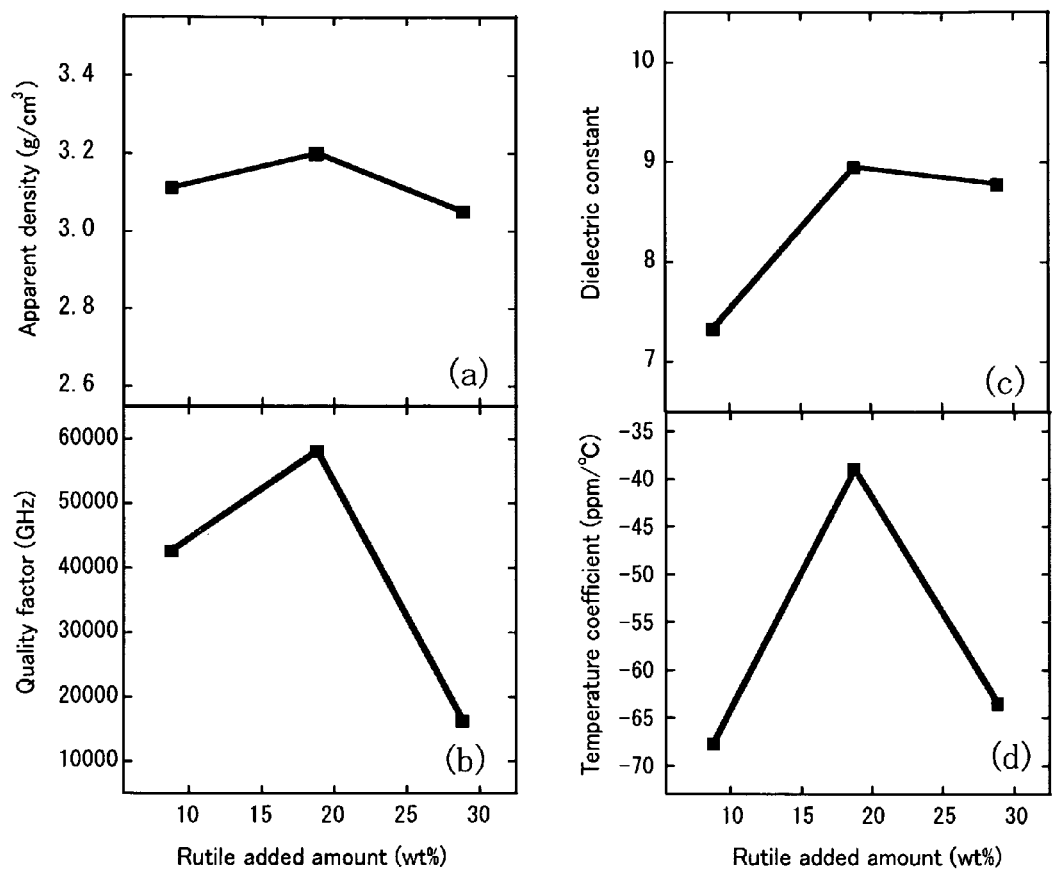
Figure 5:
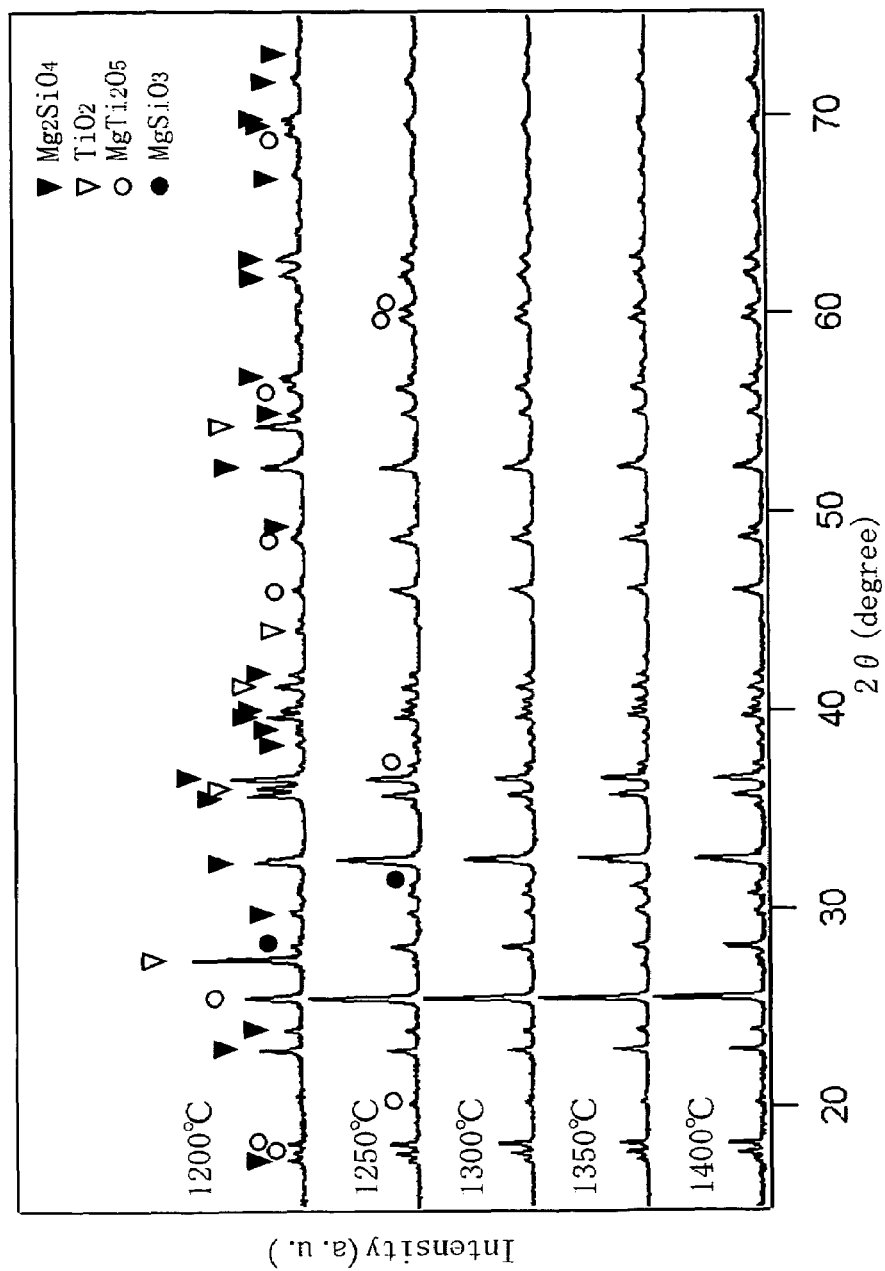
Figure 6:
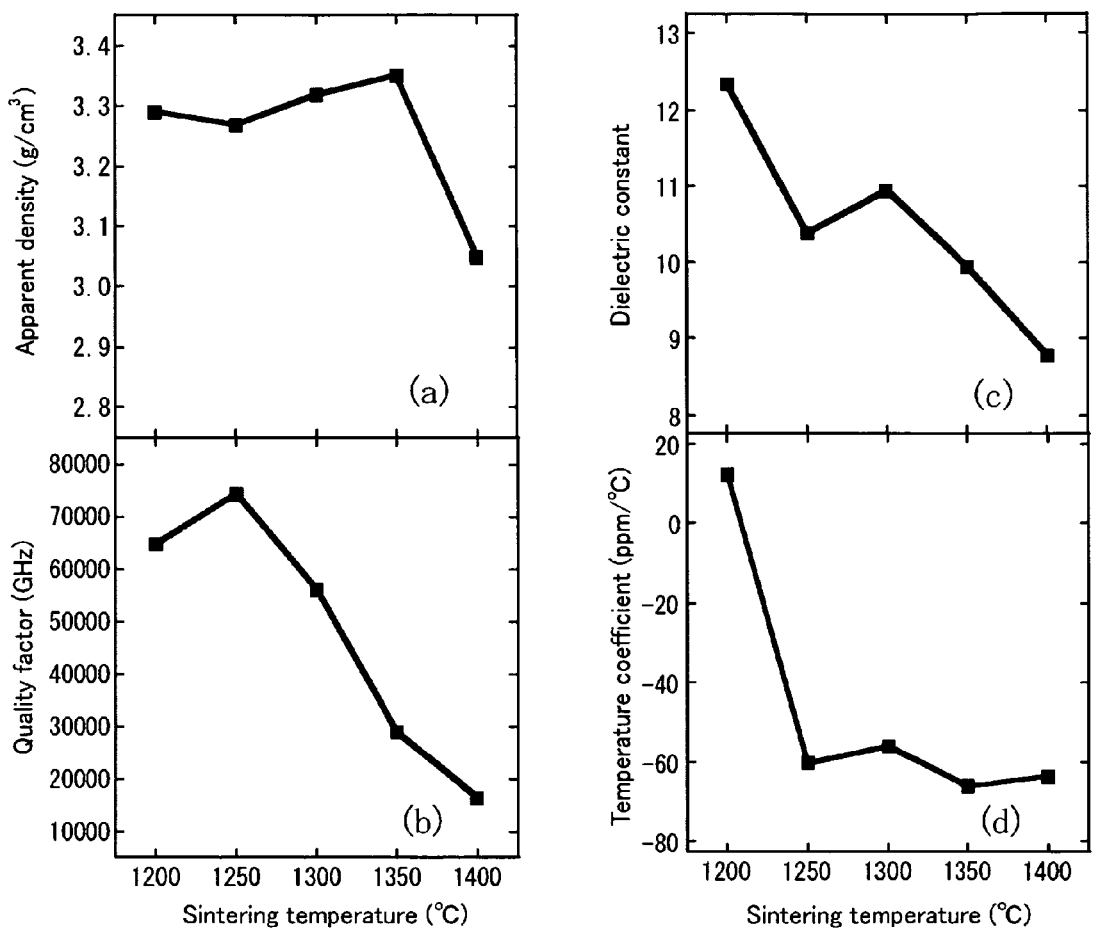
Figure 7:
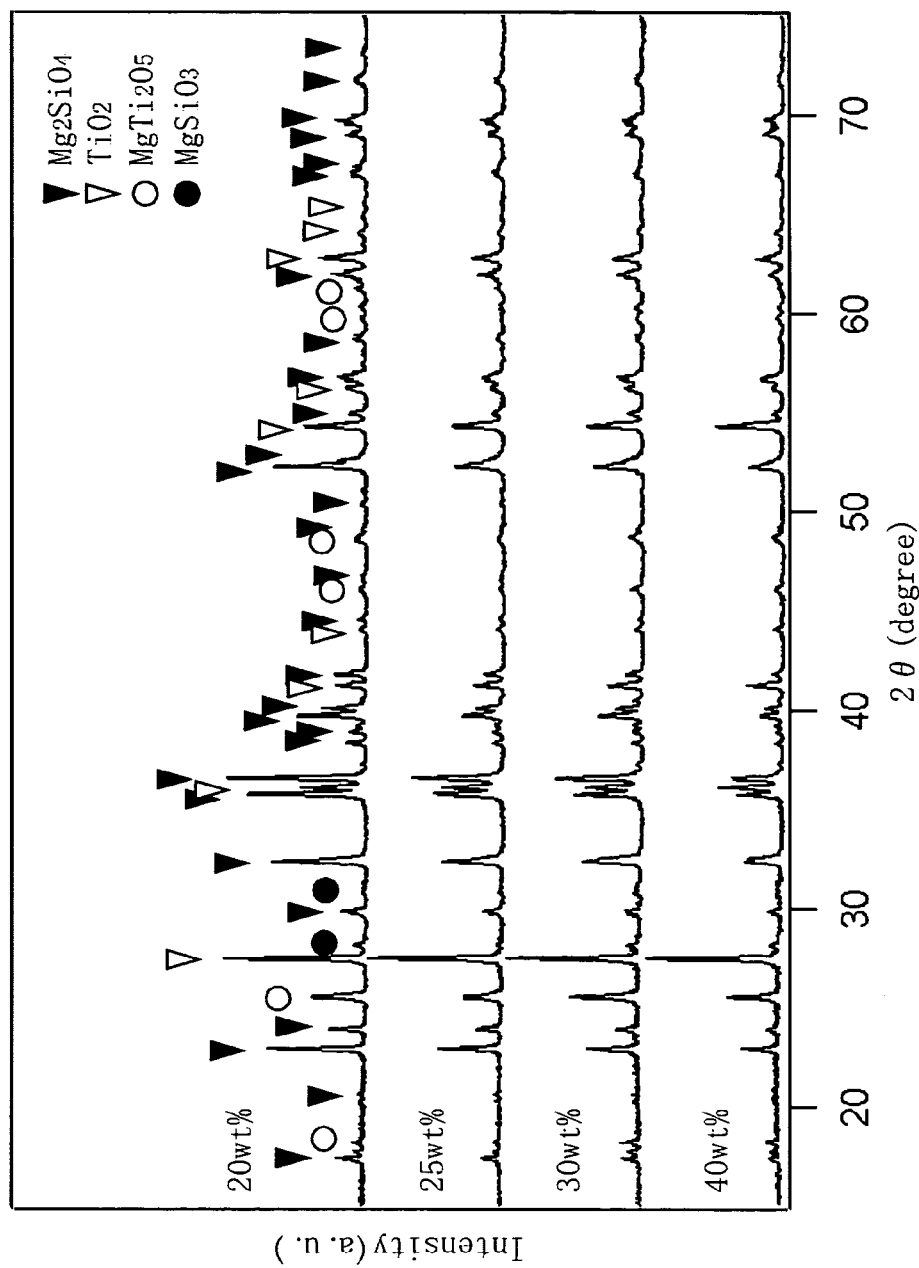
Figure 8:
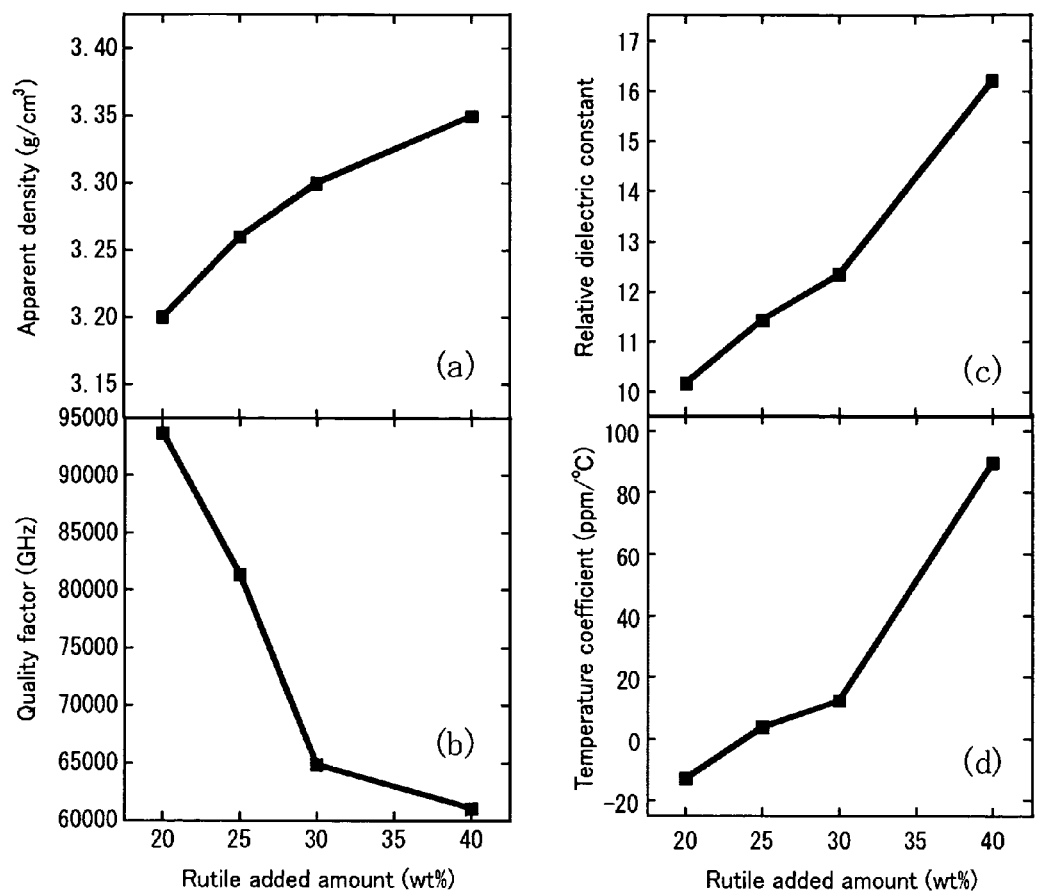
Figure 9:
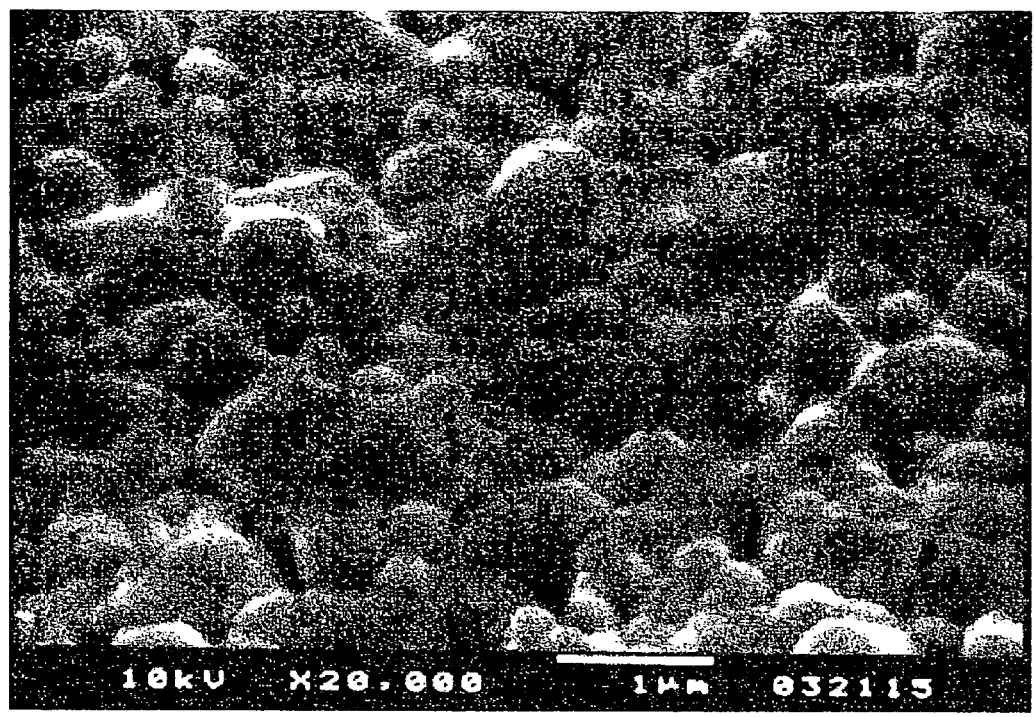
Figure 10:
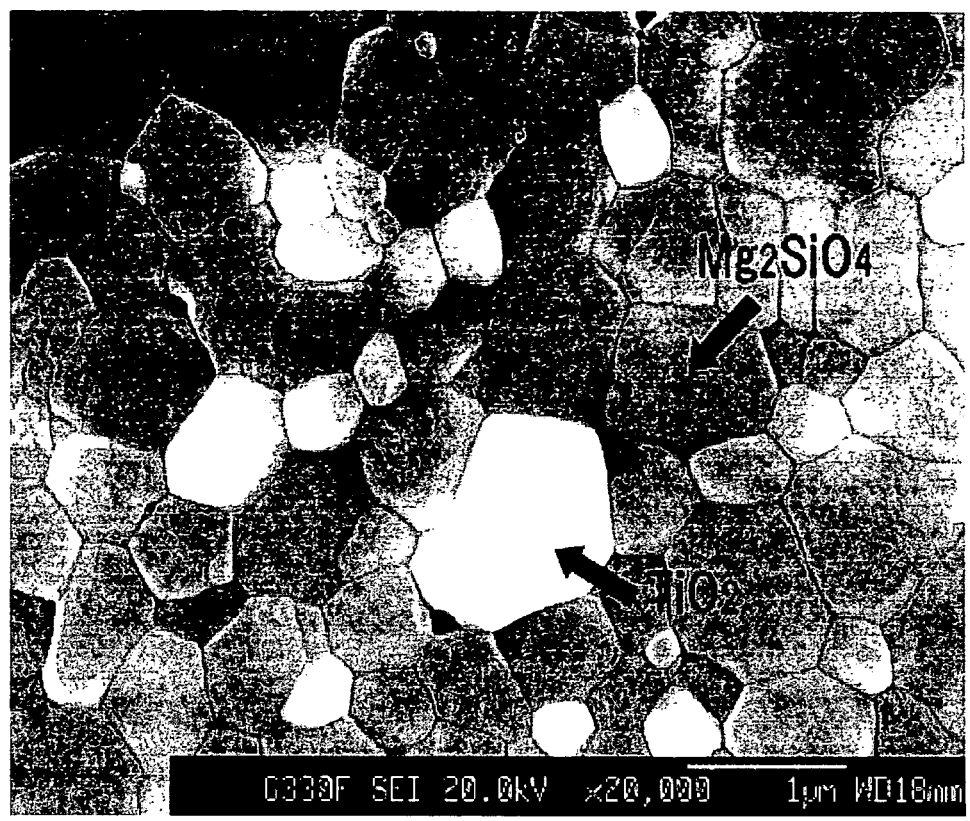
Figure 11:
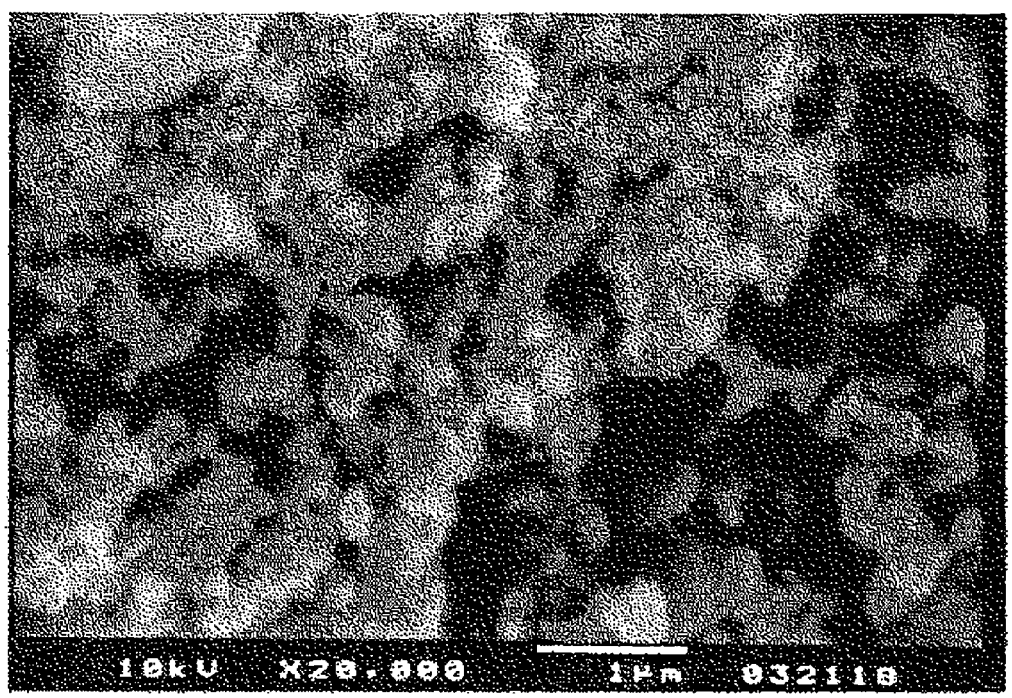

Graph (a) illustrates the relationship between sintering temperature and relative density;

Graph (b) illustrates the relationship between sintering temperature and quality factor;

Graph (c) illustrates the relationship between sintering temperature and relative dielectric constant;

Graph (d) illustrates the relationship between sintering temperature and temperature coefficient;

FIG. 3 is an X-ray diffraction chart of a sintered product fired at a 1,400° C., wherein titanium dioxide had been added into the forsterite;

FIG. 4 is a series of graphs illustrating the characteristics of a sintered product fired at a 1,400° C., wherein titanium dioxide had been added into the forsterite;

Graph (a) illustrates the relationship between the added amount of titanium dioxide and apparent density;

Graph (b) illustrates the relationship between the added amount of titanium dioxide and quality factor;

Graph (c) illustrates the relationship between the added amount of titanium dioxide and relative dielectric constant;

Graph (d) illustrates the relationship between the added amount of titanium dioxide and temperature coefficient;

FIG. 5 is an X-ray diffraction chart of a sintered product fired while varying the sintering temperature, wherein titanium dioxide had been added into the forsterite;

FIG. 6 is a series of graphs illustrating the characteristics of a sintered product fired while varying the sintering temperature, wherein titanium dioxide had been added into the forsterite;

Graph (a) illustrates the relationship between sintering temperature and apparent density;

Graph (b) illustrates the relationship between sintering temperature and quality factor;

Graph (c) illustrates the relationship between sintering temperature and relative dielectric constant;

Graph (d) illustrates the relationship between sintering temperature and temperature coefficient;

FIG. 7 is an X-ray diffraction chart of a sintered product fired at a 1,200° C., while varying the added amount of titanium dioxide;

FIG. 8 is a series of graphs illustrating the characteristics of a sintered product fired at a 1,200° C., while varying the added amount of titanium dioxide;

Graph (a) illustrates the relationship between the added amount of titanium dioxide and apparent density;

Graph (b) illustrates the relationship between the added amount of titanium dioxide and quality factor;

Graph (c) illustrates the relationship between the added amount of titanium dioxide and relative dielectric constant;

Graph (d) illustrates the relationship between the added amount of titanium dioxide and temperature coefficient;

FIG. 9 is an electron micrograph-1 of a sintered product fired at a 1,200° C.;

FIG. 10 is an electron micrograph-2 of a sintered product fired at a 1,200° C.;

FIG. 11 is an electron micrograph of a sintered product fired at a 1,150° C.

Figure 12:
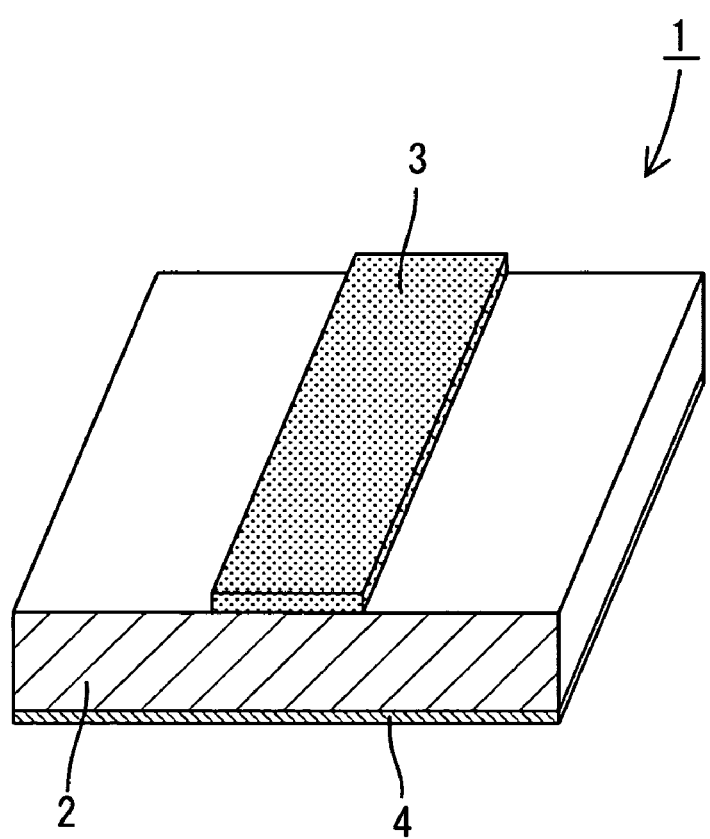
Figure 13:
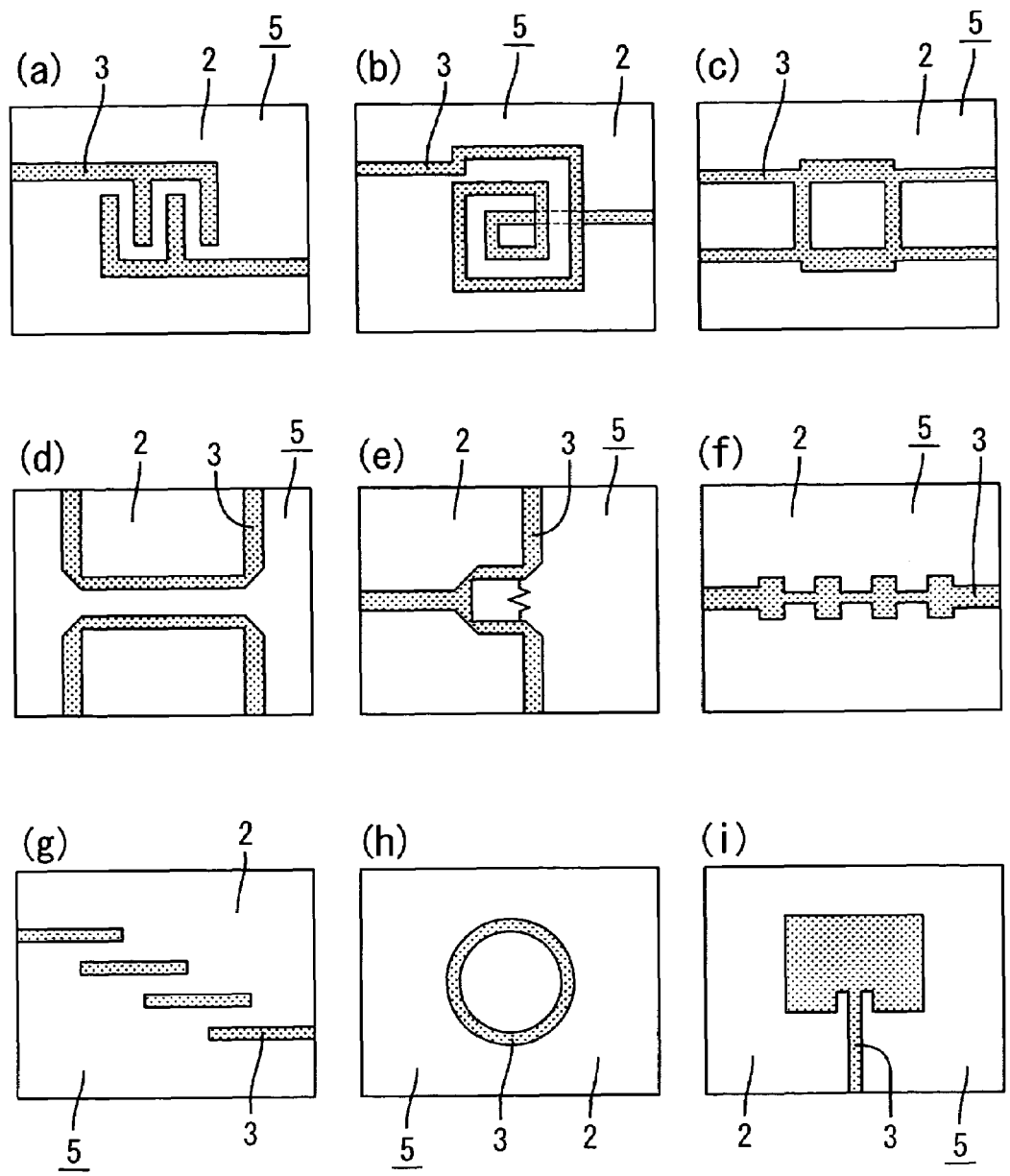
Figure 14:
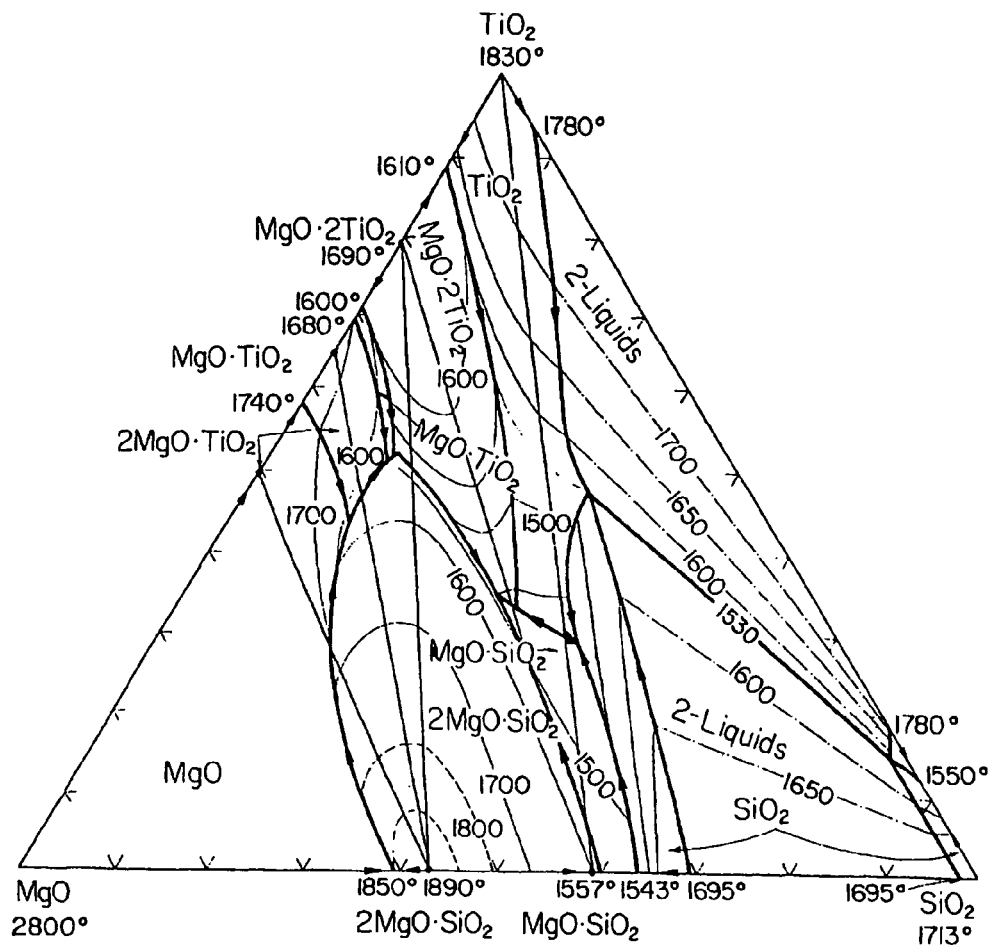

FIG. 12 is a structural diagram of a microstrip line;

FIG. 13 is a plan diagram illustrating the various strip line patterns in a high-frequency planar circuit (a) Interdigital capacitor
(b) Spiral inductor
(c) Branch circuit
(d) Directional coupler
(e) Power divider/combiner
(f) Low-pass filter
(g) Band-pass filter
(h) Ring resonator
(i) Patch antenna; and FIG. 14 is a phase diagram of an MgO—SiO$_2$—TiO$_2$ three-component system.

DETAILED DESCRIPTION OF THE INVENTION

The high-frequency ceramic composition according to the present invention is a composition that has been sintered while retaining the crystal phases of both the forsterite and the rutile-type titanium dioxide. For a sintered product such as this, the high quality factor derived from forsterite can be maintained, and, the temperature coefficient $\tau_f$ can be controlled by adjusting the added amount of the rutile-type titanium dioxide.

Figure 1:
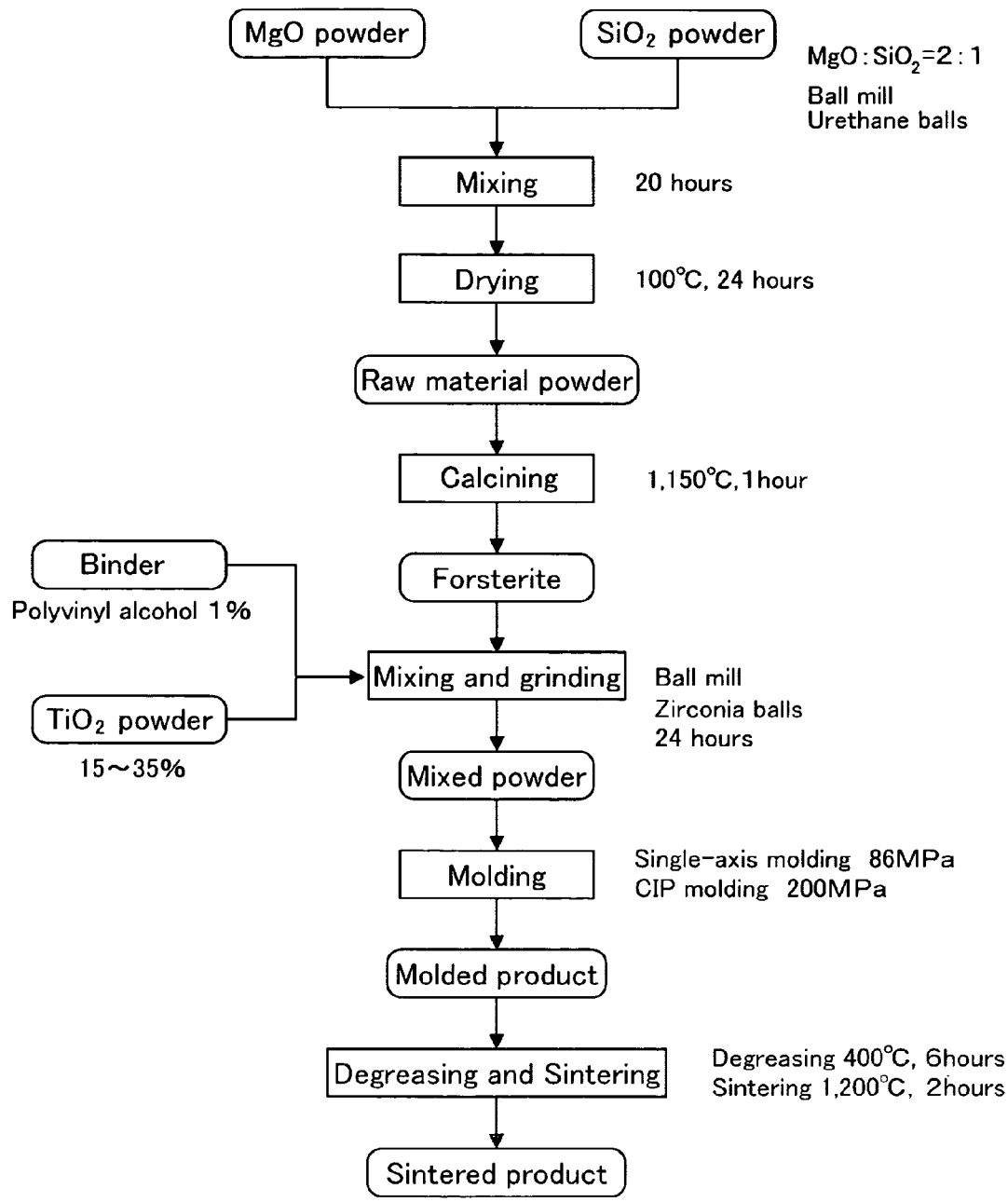
FIG. 1 is a flow chart illustrating the production steps of the high-frequency ceramic composition according to the present invention.

A high-frequency ceramic composition such as this can be sintered by a firing process at a low temperature, such as that in which forsterite and titanium dioxide coexist, or can be sintered by a method that completes firing in an extremely short period of time, such as firing using microwave heating or plasma firing. In particular, a method that can be preferably employed mixes 15% by weight or more to 35% by weight or less of rutile-type titanium dioxide into forsterite, and then carries out firing at about 1,200° C. A process diagram illustrating one example of the production processes of a high-frequency ceramic composition according to the present invention is shown in FIG. 1.

It is preferable to use high purity materials for both the MgO and SiO$_2$, which are the forsterite raw materials. Specifically, materials having a purity of 99.9% or greater are preferably used. Further, while the grain size is preferably as small as possible, the grain size may be a size that thoroughly reacts during calcining. In each of the steps, it is required to employ materials and means so that impurities are not mixed in, and carry out operations by giving consideration so as to avoid impurities from being mixed into the sintered product as much as possible.

In the calcining step, the calcining can be carried out from 1,000° C. or more to 1,200° C. or less, and from 1 to 8 hours. By carrying out such calcining, an excellent single-phase forsterite can be synthesized. Temperatures lower than 1,000° C. or higher than 1,200° C. are not preferable, as the forsterite does not synthesize well.

In the mixing step, rutile-type titanium dioxide is added along with a binder into the forsterite obtained from the calcining. The mixing and grinding of these materials is carried out simultaneously. It is preferable to use a high purity material for the rutile-type titanium dioxide. Specifically, a material having a purity of 99.5% or greater is preferably used. The added amount is preferably from 15% by weight or more to 35% or less of the forsterite, and from 20% by weight or more to 30% or less is more preferable. As the binder, organic starch adhesives such as a polyvinyl alcohol and methyl cellulose can be preferably used.

The grinding can be conducted, for example, for 16 to 48 hours employing a ball mill that uses zirconia balls. At such stage, grinding is carried out until the grain size distribution of the mixed powder has an average grain size of 3 μm or less, and more preferably 11 or less. If the mixed powder grain diameter is greater than this, the sintering characteristics deteriorate, whereby a high-density sintered product cannot be obtained.

In the molding step, the pressure-molding can be carried out, for example, by using uniaxial press molding.

In the sintering step, the degreasing treatment can be conducted under conditions wherein the organic matter of the binder etc. contained in the molded product is gradually burned off, for example, at 300 to 500° C. for 4 to 8 hours. It is also required to carry out the sintering at about 1,200° C. Here, the sintering temperature refers to the temperature measured by installing a thermocouple in the heating furnace. In addition, "about 1,200° C." does not only mean exactly 1,200° C., it also includes a margin of error. There is an error of ±2 to 3° C. at a central location of the furnace, and across the entire furnace an error of about ±30° C. depending on the measurement location. A sintering temperature less than this is not preferable because the forsterite does not sinter, while a temperature higher than this is not preferable because the forsterite reacts with the titanium dioxide and is lost.

The high-frequency ceramic composition according to the present invention can be preferably applied for a high-frequency planar circuit in particular. FIG. 12 illustrates the structure of a microstrip line 1. The microstrip line 1 is the most fundamental circuit element for constituting a microwave or milliwave integrated circuit, and consists of a dielectric substrate 2, a strip conductor 3 that is formed on one of the front and back surfaces of the dielectric substrate 2, and a ground conductor 4 that is formed on the other surface. A high-frequency planar circuit 5 has this microstrip line 1 as its main structural element. An actual high-frequency planar circuit 5 includes various kinds of unconnected members in addition to uniform transmission lines. These unconnected members are employed to realize variously patterned actual high-frequency planar circuits 5, such as those illustrated in FIG. 13(a) to (i). For the pattern formation of such various high-frequency planar circuits 5, it is preferable to apply a high-precision thin-film minute treatment process that is excellent in mass production and characteristics repeatability. Palladium, copper, gold, and the like, are preferable as the strip conductor 3 material.

As the substrate for supporting this strip conductor 3, Teflon (registered trademark), quartz, alumina and the like can generally be used, although such materials have poor frequency temperature coefficient ($\tau_f$) (about −70 ppm/° C.), and thus could not be employed as a resonator or filter material. Although a development example using a conductor in which $\in_r$=24, Q·f=350,000 GHz and $\tau_f$=0 ppm/° C. in a planar type filter has been proposed, ("A Ka-band Diplexer Using Planar TE Mode Dielectric Resonators with Plastic Package"; T. Hiratsuka, T. sonoda, S. Mikami, K. Sakamoto and Y. Takimoto, Metamorphosis, No. 6, pp. 38-39 (2001)), in order to handle the even higher frequencies of the future, the development of a dielectric material having a low dielectric constant in which $\in_r$ is about 10 or less, a high Q value (Q·f of 60,000 GHz or greater) and a $\tau_f$ of 30 ppm/° C. or less has been awaited. The high-frequency ceramic composition according to the present invention has a small temperature coefficient $\tau_f$ of 30 ppm/° C. or less, and a quality factor Q·f of about 82,000 GHz, which although lower than the above-described dielectric constant, is able to increase the volume of the dielectric resonator because of the low relative dielectric constant $\in_r$=11. In this case, since volume increases by a factor of 24/11, i.e. about 2.2 times, Q proportionally increases by that amount so that Q·f=82,000×2.2=180,400 GHz, which is equivalent to a material having a high Q·f value and can manifest the same performance. Further, since the relative dielectric constant $\in_r$ is low, processing accuracy also has more leeway, and can thus be said to be an excellent material in terms of cost reduction and mass production.

EXAMPLES

The present invention will now be explained in further detail with reference to the following Examples.

[Preliminary Test Investigating the Dielectric Properties of Forsterite to Which Titanium Dioxide has not been Added]

As a preliminary test, first a test was conducted to investigate the properties of forsterite to which titanium dioxide has not been added.

1. Test Method

<Preliminary test 1-1>

1) Production of the Sintered Product (i) Preparation of Forsterite

An MgO powder having a purity of 99.9% or more, an average grain size of 0.09 μm, and a specific surface area of 26.03 m²/g, and a SiO₂ powder having a purity of 99.9% or more, an average grain size of 0.82 μm, and a specific surface area of 1.78 m²/g, were weighed out in a 2:1 molar ratio. The mixture was charged with distilled water and the resulting solution was mixed for 20 hours with a ball mill using urethane balls. This mixed powder was dried for 24 hours at 100° C. Next, the mixture (i.e., raw material powder) was calcined for 1 hour at 1,150° C., to thereby yield a calcined product of forsterite. This calcined product was ground for 24 hours in distilled water with a ball mill using zirconia balls, after which the ground powder was dried for 24 hours at 100° C. to yield a forsterite powder.

(ii) Production of the Sintered Product

As a binder, 1% of polyvinyl alcohol was charged to the forsterite powder prepared as described (i) above and mixing was carried out. The resulting mixture was molded by uniaxial pressure for 2 minutes at 86 Mpa using a 12 mm diameter metal mold, and then molded again by a cold isotropic press (CIP) for 2 minutes at 200 Mpa, to thereby yield a molded product in pellet form.

Next, the molded product was placed in a heating furnace and subjected to degreasing by heating for 6 hours at 400° C. The temperature was raised, and sintering was carried out for 2 hours at 1,300° C., whereby a sintered product was obtained. The temperature increase/decrease rate was set at 5° C./min.

2) Tests (i) Relative density

The relative density was obtained by calculating the apparent density using Archimedes' method, and dividing that value from the theoretical density.

(ii) Dielectric Properties

After both ends of the above-obtained sintered product had been lapped, the relative dielectric constant $\in_r$, quality factor Q·f, and temperature coefficient $\Sigma_f$, were measured in accordance with a double-ended shunt form dielectric resonator method (JIS R 1627) using a modified Hakki and Coleman method. The measuring frequency was conducted at between 12 and 17 GHz. The temperature coefficient $\tau_f$ was obtained from the change in resonance frequency between a temperature range of +20 to +80° C.

<Preliminary Test 1-2>

A sintered product was produced and tested in the same manner as in Preliminary test 1-1, except that the sintering temperature during the sintering was set to 1,350° C.

<Preliminary Test 1-3>

A sintered product was produced and tested in the same manner as in Preliminary test 1-1, except that the sintering temperature during the sintering was set to 1,400° C.

<Preliminary Test 1-4>

A sintered product was produced and tested in the same manner as in Preliminary test 1-1, except that the sintering temperature during the sintering was set to 1,450° C.

<Preliminary Test 1-5>

A sintered product was produced and tested in the same manner as in Preliminary test 1-1, except that the sintering temperature during the sintering was set to 1,500° C.

2. Results and Consideration

Table 1 illustrates the calculated results of the relative density, relative dielectric constant $\in_r$, quality factor Q·f, and temperature coefficient $\tau_f$, in the Preliminary tests 1-1 to 1-5. Further, FIG. 2 is a series of graphs illustrating (a) the relationship between sintering temperature and relative density, (b) the relationship between sintering temperature and quality factor, (c) the relationship between sintering temperature and relative dielectric constant, and (d) the relationship between sintering temperature and temperature coefficient.

TABLE 1

| Sintering temperature [° C.] | Relative density [%] | Dielectric constant | Q · f [GHz] | $\tau_f$ [ppm/° C.] |
|---|---|---|---|---|
| 1300 | 92.5 | 5.97 | 23594 | −79.5 |
| 1350 | 98.4 | 6.89 | 147759 | −69.2 |
| 1400 | 98.7 | 6.95 | 157569 | −76.7 |
| 1450 | 99.0 | 6.81 | 167579 | −72.0 |
| 1500 | 98.4 | 6.75 | 115841 | −70.3 |

Figure 2:
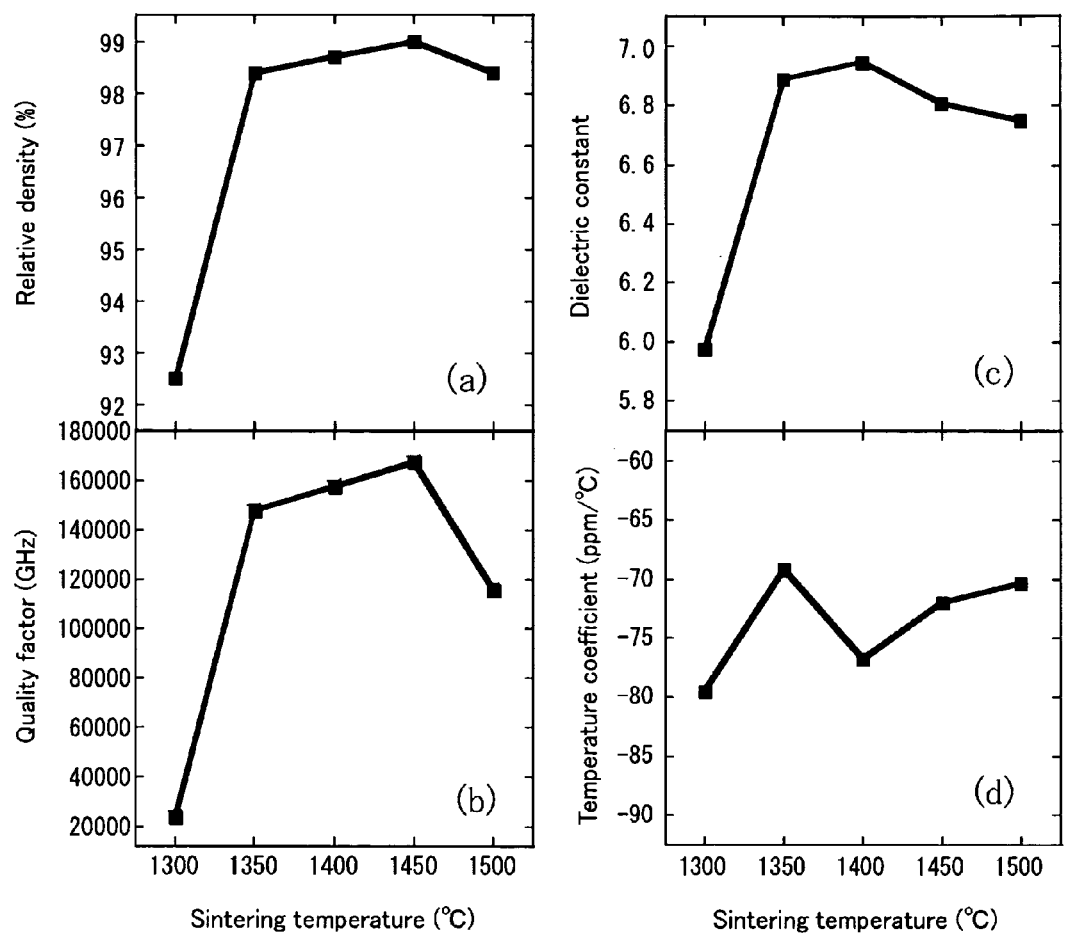
FIG. 2 is a series of graphs illustrating the characteristics of forsterite to which no titanium dioxide had been added.

In Table 1 and FIG. 2, when sintering at 1,300° C. the relative density of the sintered product was 92.5%, whereby a compact sintered product could not be obtained. When sintering at 1,350° C. or more, the relative density of the sintered product was 98% or more, whereby the quality factor Q·f was also 100,000 GHz or more. Regardless of sintering temperature, the temperature coefficient $\tau_f$ exhibited a large negative value of −80 to −70° ppm/° C.

[Preliminary Test Investigating the Additive Effects of Titanium Dioxide]

As described above, forsterite has a large negative temperature coefficient $\tau_f$. In view of this, controlling the temperature coefficient $\tau_f$ by adding titanium dioxide, which has a positive temperature coefficient, was investigated.

1. Test Method

<Preliminary Test 2-1>

1) Production of the Sintered Product (i) Calcining Step

A forsterite powder was prepared in the same manner as in 1) (i) of the above-described Preliminary test 1-1.

(ii) Mixing Step

The forsterite powder prepared in (i) was charged with 10% by weight, with respect to the forsterite powder, of rutile-type titanium dioxide having a purity of 99.5% or greater. The resulting mixture was further charged with 1% of polyvinyl alcohol as a binder. This mixture was ground in distilled water with a ball mill using zirconia balls until the average particle diameter reached 1 μm (24 hours), after which the ground powder was dried for 24 hours at 100° C. to thereby yield a mixed powder.

(iii) Molding Step

Molding was carried out by adding a binder to the mixed powder obtained in (ii) in the same manner as in 1) (ii) of the above-described Preliminary test 1-1.

(iv) Sintering Step

The molded product obtained in (iii) was placed in a heating furnace, and sintering was carried out in the same manner as in 1) (ii) of the above-described Preliminary test 1-1. The sintering temperature was set at 1,400° C.

2) Tests (i) Powder X-ray Diffraction (XRD) Analysis

The obtained sintered product was subjected to powder X-ray diffraction analysis (ray source: CuKα)

(ii) Apparent Density

The apparent density $\rho_a$ was calculated by the following procedures.

(a) The weight W of the test sample was determined using a balance.

(b) Distilled water and the test sample were charged into a beaker.

(c) The beaker was placed in a vacuum desiccator and degassed.

(d) The test sample was mounted on the hook of a float balance using a set of tweezers, and the weight $W_w$ of the sample in water was determined.

(e) Apparent density $\rho_a$ was calculated using formula (1) below:

$$\rho_a = \{(W/(W-W_w)\} \cdot \rho_w \quad (1)$$

(wherein W denotes the test sample weight, $W_w$ denotes the test sample weight in water, $\rho_a$ denotes the apparent density, and $\rho_w$ denotes the density of water at such temperature)

(iii) Dielectric Properties

Testing was carried out in the same manner as in 2) of the above-described Preliminary test 1-1.

<Preliminary Test 2-2>

A sintered product was produced and tested in the same manner as in the above-described Preliminary test 2-1, except that the added amount of titanium dioxide was set at 20% by weight.

<Preliminary Test 2-3>

A sintered product was produced and tested in the same manner as the above-described Preliminary test 2-1, except that the added amount of titanium dioxide was set at 30% by weight.

2. Results and Consideration

Table 2 illustrates the calculated results of the apparent density, relative dielectric constant $\in_r$, quality factor Q·f, and temperature coefficient $\tau_f$, in the Preliminary tests 2-1 to 2-3. Further, FIG. 3 illustrates the X-ray diffraction chart of the sintered products. FIG. 4 is a series of graphs illustrating (a) the relationship between the added amount of titanium dioxide and apparent density, (b) the relationship between the added amount of titanium dioxide and quality factor, (c) the relationship between the added amount of titanium dioxide and relative dielectric constant, and (d) the relationship between the added amount of titanium dioxide and temperature coefficient.

TABLE 2

| Rutile added amount wt[%] | Apparent density [g/cm³] | Dielectric constant | Q · f [GHz] | $\tau_f$ [ppm/° C.] |
|---|---|---|---|---|
| 10 | 3.11 | 7.3286 | 42742 | −67.7 |
| 20 | 3.20 | 8.9514 | 58244 | −39.0 |
| 30 | 3.05 | 8.7936 | 16266 | −63.4 |

According to FIG. 3, hardly any peaks of the titanium dioxide (FIG. 3, light-shaded triangle) can be seen, regardless of the added amount of titanium dioxide, although $MgSiO_3$ and $MgTi_2O_5$ peaks (FIG. 3, dark-shaded circle and light-shaded circle) can be observed. Further, as the added amount gets larger, the forsterite peaks (FIG. 3, dark-shaded triangle) become weaker, while the $MgTi_2O_5$ peaks become stronger.

In Table 2 and FIG. 4, the quality factor Q·f decreases compared with when titanium dioxide was not added. The decrease is especially marked when 30% of titanium dioxide was added. This is thought to be due to the forsterite reacting with the titanium dioxide to form $MgSiO_3$ and $MgTi_2O_5$ during sintering.

Further, while the temperature coefficient $\tau_f$ improved to −39 ppm/° C. when 20% of titanium dioxide was added, the temperature coefficient again decreased to −63.4 ppm/° C. when the added amount was increased to 30%. This is thought to be a result of the rutile phase of the titanium dioxide being lost from the reaction with forsterite, whereby the controlling effects of the temperature coefficient $\tau_f$ were not manifested.

[Examples Investigating the Optimal Sintering Temperature]

As discussed above, if titanium dioxide is added into the forsterite and the resulting mixture fired under the same conditions as those for non-added forsterite, a sintered product having good dielectric properties cannot be obtained as the forsterite and the titanium dioxide react with each other. In view of this, sintered products were produced while varying the temperature in order to discover the optimal sintering conditions.

1. Test Method

Example 1

A sintered product was produced and tested in the same manner as in the above-described Preliminary test 2-1, except that the added amount of titanium dioxide was set at 30% by weight, and the sintering temperature was set at 1,200° C.

Comparative Example 1-1

A sintered product was produced and tested in the same manner as in the above-described Preliminary test 2-1, except that the added amount of titanium dioxide was set at 30% by weight, and the sintering temperature was set at 1,250° C.

Comparative Example 1-2

A sintered product was produced and tested in the same manner as in the above-described Preliminary test 2-1, except that the added amount of titanium dioxide was set at 30% by weight, and the sintering temperature was set at 1,300° C.

Comparative Example 1-3

A sintered product was produced and tested in the same manner as in the above-described Preliminary test 2-1, except that the added amount of titanium dioxide was set at 30% by weight, and the sintering temperature was set at 1,350° C.

Comparative Example 1-4

A sintered product was produced and tested in the same manner as in the above-described Preliminary test 2-1, except that the added amount of titanium dioxide was set at 30% by weight, and the sintering temperature was set at 1,400° C.

2. Results and Consideration

Table 3 shows the calculated results of the apparent density, relative dielectric constant $\in_r$, quality factor Q·f, and temperature coefficient $\tau_f$, in the Example 1 and Comparative Examples 1-1 to 1-4. Further, FIG. 5 illustrates the X-ray diffraction chart of the sintered products. FIG. 6 is a series of graphs illustrating (a) the relationship between sintering temperature and apparent density, (b) the relationship between sintering temperature and quality factor, (c) the relationship between sintering temperature and relative dielectric constant, and (d) the relationship between sintering temperature and temperature coefficient.

TABLE 3

| Sintering temperature [° C.] | Apparent density [g/cm³] | Dielectric constant | Q · f [GHz] | $\tau_f$ [ppm/° C.] |
|---|---|---|---|---|
| 1200 | 3.29 | 12.35 | 64829 | 12.4 |
| 1250 | 3.27 | 10.38 | 74398 | −60.4 |
| 1300 | 3.32 | 10.95 | 56180 | −55.9 |
| 1350 | 3.35 | 9.96 | 28988 | −66.2 |
| 1400 | 3.05 | 8.79 | 16266 | −63.4 |

According to FIG. 5, when sintering was carried out at 1,200° C. the forsterite and titanium dioxide peaks are strongly and clearly expressed, whereby it was confirmed that the titanium dioxide and the forsterite each retained their crystal phase. In contrast to this, when sintering was carried out at 1,250° C. or more, the titanium dioxide peaks were extremely weak, whereby it was discovered that the rutile phase had mostly been lost as a result of reacting with forsterite.

In Table 3 and FIG. 6, while the apparent density showed little change at about 3.3 g/cm$^3$ for a sintering temperature of 1,350° C., for a sintering temperature of 1,400° C. the apparent density dramatically declined.

Corresponding with this, while the quality factor Q·f also exhibited a comparatively good value of 30,000 GHz or more at a sintering temperature of 1,350° C. or lower, when the sintering temperature was 1,400° C. or higher, the quality factor Q·f declined to 16,000 GHz. The relative dielectric constant $\in_r$ exhibited its best value of 12.35 at a sintering temperature of 1,200° C., although this declined as the sintering temperature increased.

While the temperature coefficient $\tau_f$ shifted around −60 ppm/° C. when the sintering temperature was 1,250° C. or more, when the sintering temperature was 1,200° C. the temperature coefficient switched to a positive value of +12.4 ppm/° C., whereby the effects of adding titanium dioxide were seen.

Thus, it was discovered that at a sintering temperature of 1,200° C., the temperature coefficient $\tau_f$ can be controlled while maintaining the quality factor Q·f and relative dielectric constant $\delta_r$ at good values by sintering with the titanium dioxide and the forsterite, both retaining their crystal phase.

[Examples Investigating the Optimal Added Amount of Titanium Dioxide]

Taking the above results into account, the sintering temperature was fixed at 1,200° C. The optimal added amount was investigated by producing sintered products while varying the added amount of titanium dioxide.

1. Test Method

Example 2-1

A sintered product was produced and tested in the same manner as in preliminary test 2-1, except that the added amount of titanium dioxide was set at 20% and the sintering temperature was set at 1,200° C.

Example 2-2

A sintered product was produced and tested in the same manner as in preliminary test 2-1, except that the added amount of titanium dioxide was set at 25% and the sintering temperature was set at 1,200° C.

Example 2-3

A sintered product was produced and tested in the same manner as in preliminary test 2-1, except that the added amount of titanium dioxide was set at 30% and the sintering temperature was set at 1,200° C.

Comparative Example 2

A sintered product was produced and tested in the same manner as in preliminary test 2-1, except that the added amount of titanium dioxide was set at 40% and the sintering temperature was set at 1,200° C.

2. Results and Consideration

Table 4 shows the calculated results of the apparent density, relative dielectric constant $\in_r$, quality factor Q·f, and temperature coefficient $\tau_f$, in Examples 2-1 to 2-3 and Comparative Example 2. Further, FIG. 7 illustrates the X-ray diffraction chart of the sintered products. FIG. 8 is a series of graphs illustrating (a) the relationship between the added amount of titanium dioxide and apparent density, (b) the relationship between the added amount of titanium dioxide and quality factor, (c) the relationship between the added amount of titanium dioxide and relative dielectric constant, and (d) the relationship between the added amount of titanium dioxide and temperature coefficient.

TABLE 4

| Rutile added amount wt[%] | Apparent density [g/cm$^3$] | Dielectric constant | Q · f [GHz] | $\tau_f$ [ppm/° C.] |
|---|---|---|---|---|
| 20 | 3.20 | 10.17 | 93758 | −12.7 |
| 25 | 3.26 | 11.44 | 81348 | 3.95 |
| 30 | 3.30 | 12.35 | 64829 | 12.4 |
| 40 | 3.35 | 16.21 | 61054 | 89.9 |

In FIG. 7, all of the added amounts the titanium dioxide peaks are expressed as maximum peaks. The forsterite peaks are expressed strongly and clearly.

In Table 4 and FIG. 8, apparent density and relative dielectric constant $\in_r$ increased in a generally linear fashion in conjunction with increase in the added amount. The quality factor Q·f exhibited a comparatively good value of 80,000 GHz or more at added amounts of 20% by weight and 25% by weight. However, increasing the added amount to 30% by weight caused a slight decrease to 65,000 GHz. Increasing to an added amount of 40% by weight caused a decrease to 61,000 GHz.

Temperature coefficient $\tau_f$ increased in a linear fashion in conjunction with increase in the added amount and was in the range of ±20 ppm/° C. for added amounts of 20% by weight to 30% by weight. When the added amount was 25% by weight, the temperature coefficient $\tau_f$ was 3.95 ppm/° C., which was the closest value to 0 ppm/° C. According to the graph, the temperature coefficient $\tau_f$ was approximately 0 ppm/° C. at an added amount of 24% by weight, while at such an amount the relative dielectric constant $\in_r$ was about 11 and the quality factor Q·f was about 82,000 GHz.

FIGS. 9 and 10 are electron micrographs of a sintered product fired at a 1,200° C. sintering temperature and a titanium dioxide added amount of 25% by weight. FIG. 11 is an electron micrograph of a sintered product fired at a 1,150° C. sintering temperature and a titanium dioxide added amount of 25% by weight.

It can be seen from FIGS. 9 and 10 that for a sintering temperature of 1,200° C., the particles of the forsterite and titanium dioxide undergo particle growth and a compact sintered product is formed. In contrast, it can be seen from FIG. 11 that for a sintering temperature of 1,150° C., particle growth does not progress and a compact sintered product cannot be obtained.

The sintering temperature can, therefore, be lowered to 1,200° C. by adding a large quantity of titanium dioxide into the forsterite. At this temperature, sintering can be carried out while retaining the crystal phases of the forsterite and titanium dioxide. A sintered product obtained in such a manner is an excellent high-frequency ceramic composition, wherein the high quality factor Q·f value derived from forsterite is hardly impaired, and, the absolute value of the temperature coefficient $\tau_f$ is controlled to 30 ppm/° C. or less by rutile-type titanium dioxide.

By setting the titanium dioxide added amount to 15% by weight or more to 35% by weight or less, a high-frequency ceramic composition can be obtained having a quality factor Q·f of 60,000 GHz or more and a temperature coefficient $\tau_f$ in the range of ±30 ppm/° C. Furthermore, by setting the titanium dioxide added amount to 20% by weight or more to 30% by weight or less, the temperature coefficient $\tau_f$ can be made to be in the range of ±20 ppm/° C. Still further, by setting the titanium dioxide added amount to 20% by weight or more to 25% by weight or less, a high-frequency ceramic composition can be obtained having a quality factor Q·f of 80,000 GHz or more and a temperature coefficient $\tau_f$ in the range of ±20 ppm/° C.

INDUSTRIAL APPLICABILITY

According to the present invention, a high-frequency ceramic composition and production method thereof, and a high-frequency planar circuit that applies such composition and method, can be provided that is able to realize improvements in temperature characteristics while maintaining the excellent high-frequency characteristics that forsterite has.

The invention claimed is:

1. A high-frequency ceramic composition comprising:
a sintered product of forsterite and rutile-type titanium dioxide, wherein the rutile-type titanium dioxide in an amount of 15% or more by weight to 35% or less by weight and the forsterite are sintered so as to retain respective crystal phases thereof.

2. A high-frequency planar circuit comprising:
a ceramic substrate;
a strip conductor that is formed on one of a front surface and a back surface of the ceramic substrate, and
a ground conductor that is formed on the other of the front surface and the back surface,
wherein the ceramic substrate comprises a sintered product in which rutile-type titanium dioxide in an amount of 15% or more by weight to 35% or less by weight and forsterite are sintered so as to retain respective crystal phases thereof.

3. The high-frequency planer circuit according to claim 2 wherein the strip conductor is palladium.

4. The high-frequency planer circuit according to claim 2 wherein the strip conductor is copper.

5. The high-frequency planer circuit according to claim 2 wherein the strip conductor is gold.

* * * * *